Patented July 10, 1928.

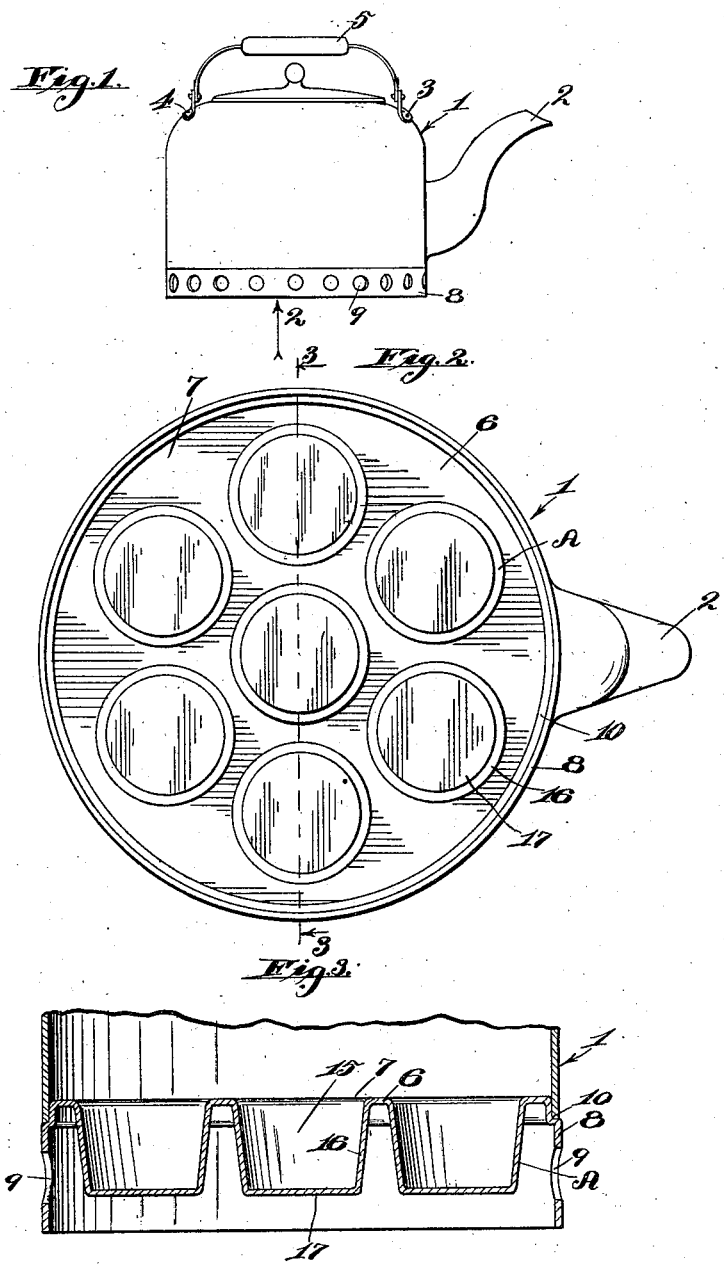

1,676,320

UNITED STATES PATENT OFFICE.

WILLIAM JAMES BURROUGHES, OF LONDON, ENGLAND, ASSIGNOR OF ONE-THIRD TO FRANK A. RODEN AND ONE-THIRD TO CHARLES TAYLOR, BOTH OF SANTA MONICA, CALIFORNIA.

BOILER BOTTOM.

Application filed April 4, 1927. Serial No. 180,887.

This invention relates to kitchen utensils, and more particularly to utensils which are adapted to contain liquids or the like and which are adapted to be heated by placing them over an open fire such as is generated by the usual kitchen range and an object of my invention is to provide a bottom for such utensils which will provide the maximum heating surface that is practicable.

A still further object of my invention is to provide a bottom for utensils which has a large heating surface and which heating surface is enclosed by a perforated, depending apron, whereby the gases of combustion may be thrown directly against the heating surfaces and escape through the perforations in the apron.

A still further object of my invention is to provide a receptacle which is adapted to be heated, and which is comparatively inexpensive to manufacture, which is rigid in its construction and which is well adapted to perform the services required of it.

With the foregoing and other objects in view which would be made manifest in the following detailed description and specifically pointed out in the appended claims, reference is had to the accompanying drawings for the illustrated embodiment of the invention, wherein;

Figure 1 is a side elevation of a kitchen tea kettle embodying the principles of my invention.

Figure 2 is an enlarged view taken in the direction of the arrow shown in Figure 1, and shows the actual heating surface of my improved kettle.

Figure 3 is a sectional view taken on the lines 3—3 of Figure 2, and shows the upper portion of the kettle broken away.

Referring to the accompanying drawings wherein similar reference characters designate similar parts throughout, the body of the kettle I have preferred for convenience to illustrate my invention as applied to the ordinary kitchen tea kettle, and toward this end I have designated the body of the same at 1. The conventional type of spout is shown at 2. This spout communicating with the lower portion of the tea kettle and being upwardly inclined. A pair of brackets 3 and 4 riveted to the kettle are adapted to pivotally support the conventional type of kettle handle 5. The parts so far described are merely conventional, and I lay no claim to their specific construction or arrangement of parts. My invention is illustrated in connection with the bottom of the kettle designated at 6. This bottom is formed from a single sheet of metal and comprises a flat surface 7 having a depending apron 8, through which there are a plurality of apertures 9 located a substantial distance below the flat surface 7. The space above the apertures 9 and the flat surface 7 provides a zone in which the heated gases are retarded before passing through said apertures 9. Indicated at 10 is an annular flange which annular flange is located around the upper portion of the periphery of the apron and is adapted to seat thereon the cylindrical body 1 of the kettle. The body 1 of the kettle may be welded or soldered, brazed or otherwise securely fastened and sealed to this annular flange, thereby providing within itself a receptacle for the reception of a suitable liquid or the like. The flat surface 7 forming the bottom of the kettle is provided with a plurality of spaced cup-shaped depressions 15, which depressions are preferably round and are in the form of inverted truncated cones. That is, the side wall 16 of the same slopes inwardly and downwardly, and bottom 17 bridge the side walls forming depressions in the flat surface 7 that closely resemble in appearance, the construction of muffin pans.

It will be seen then that my improved kettle provides at its bottom, a heating surface which has the maximum area that is practicable. In addition to the usual lateral area of the bottom of the tea kettle, the annular sloping walls of the cup-shaped depressions provide additional areas "A" that must be computed in determining the actual heating surface of the bottom of the kettle. The depending apron 8 serves to concentrate the combustible gases upon this heating area as the same are burned, and to prevent retardations of heating the perforations 9, permitting the gases to escape around the sides of the kettle when they have imparted the major portion of their heat to the heating surface of the kettle. I do not desire to limit myself to the use of my invention in connection with a tea kettle as shown in the accompanying drawing, as I contemplate putting my invention to use in connection with other heating utensils such as boilers, double-boilers, pots, pans and the like. I further contemplate the use of my invention in arts that are remote from that of cooking, such as the arts known throughout the industrial world as for example, in smelting, roasting, calcining in the foundries and other industrial plants.

It will be understood that various changes may be made in the detail of construction without departing from the spirit or scope of the invention as defined by the appended claim.

I claim:

A utensil for heating liquids and the like comprising in combination a body portion and a bottom therefor, said bottom being formed of a single sheet of metal having a depending apron surrounding the same, and provided with a plurality of apertures located a substantial distance from said bottom, whereby a heat retarding zone is formed by said bottom and said apron above said apertures, an annular flange and shoulder adjacent the upper edge of the apron for the seating of the lower edge of the body portion, said bottom having a plurality of downwardly extending cup shaped portions provided with inclined side walls and flat bottoms, said flat bottoms being spaced above a plane passing through the lower edge of said apron.

In testimony whereof I have signed my name to this specification.

WILLIAM JAMES BURROUGHES.